March 23, 1926.

C. LAMB

PISTON FOR SLUSH PUMPS

Filed Sept. 14, 1925

1,577,732

INVENTOR:
CHARLES LAMB,
BY
ATTORNEY

Patented Mar. 23, 1926.

1,577,732

UNITED STATES PATENT OFFICE.

CHARLES LAMB, OF LOS ANGELES, CALIFORNIA, ASSIGNOR TO WEST AMERICAN RUBBER COMPANY, INC., OF LOS ANGELES, CALIFORNIA, A CORPORATION OF CALIFORNIA.

PISTON FOR SLUSH PUMPS.

Application filed September 14, 1925. Serial No. 56,205.

*To all whom it may concern:*

Be it known that I, CHARLES LAMB, a subject of the King of Great Britain, residing at Los Angeles, in the county of Los Angeles, State of California, have invented a new and useful Piston for Slush Pumps, of which the following is a specification.

My invention relates to a unique pump piston adapted for use in a pump handling fluid containing abrasive, and it is very suitable for use in a slush pump such as is used in the oil well industry. In this industry a slush pump is utilized to pump rotary mud into a well during drilling and at other times. Such rotary mud is very abrasive and rapidly wears away the packing of the piston of the ordinary slush pump. The standard form of mud pump piston is usually constructed so that the packing may be expanded, when worn, into non-leaking contact with the cylinder of the pump, but this arrangement is not entirely satisfactory since adjustments must be frequently made to keep up the pump efficiency.

It is an object of my invention to provide a pump piston having a peripheral wall which is formed of a packing material and which automatically maintains a non-leaking engagement with the cylinder wall.

It is another object of my invention to provide a pump piston having a peripheral wall made of the packing material, the ends of which peripheral wall are initially somewhat larger than the bore of the cylinder, these ends being constricted when the piston is placed in a cylinder.

It is a further object of my invention to provide a pump piston of this character which is so formed that a pressure in the cylinder forces the peripheral wall into pressurable engagement with the cylinder wall.

It is also an object of my invention to provide a pump piston which consists of a metallic hub and a packer of suitable packing material which is carried by this hub.

It is also an object to provide a hub and packer of this character which are designed so that they may be cheaply provided and secured together.

Other objects and advantages of the invention will be made evident hereinafter.

Referring to the drawings which are for illustrative purposes only.

Figure 1:
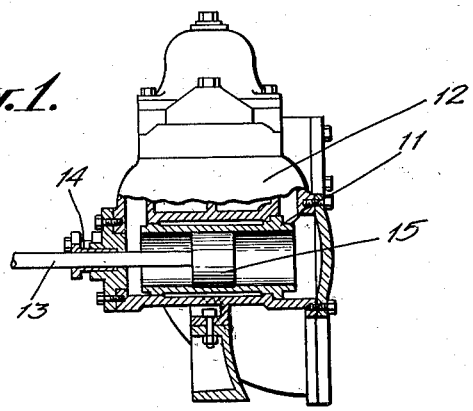
Fig. 1 is a fragmentary view partially in section showing a piston of my invention in use.

In Fig. 1 I show the mud end of a slush pump, which has a removable cylinder 11 which is supported in the body 12 of the pump. Extending into the cylinder 11 is a piston rod 13, this piston rod extending through a gland 14. Secured at the inner end of the piston rod 13 is a piston 15 which is adapted to reciprocate in the cylinder 11. As the piston 15 moves back and forth rotary mud is first drawn into one end of the cylinder 11 and is then forced therefrom by the piston 15 and simultaneously drawn into the opposite end of the cylinder 11 and then forced therefrom. Due to the fact that this rotary mud is very abrasive, the packers of the ordinary piston soon become worn and the efficiency of the pump reduces accordingly.

Figure 2:
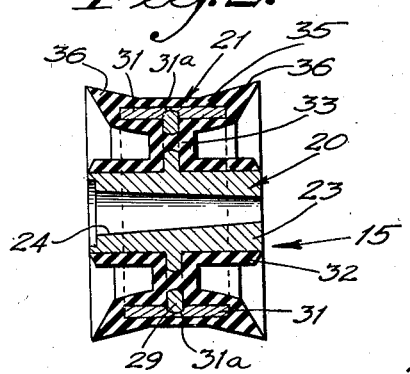
Fig. 2 is a section of a piston of my invention showing the shape of the packer before it is installed in the cylinder.
Figure 3:
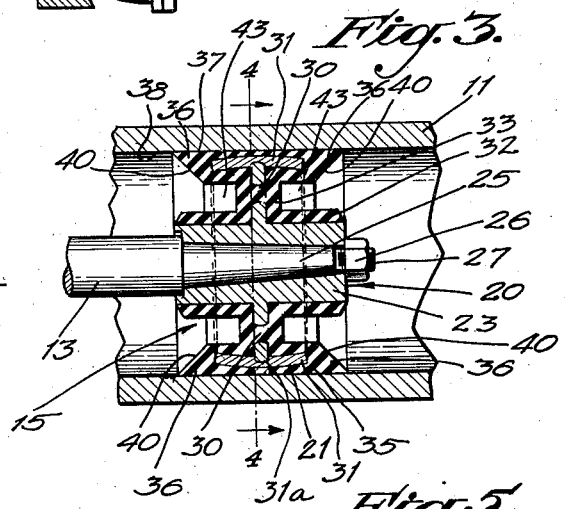
Fig. 3 is a section showing the piston of my invention installed in place.
Figure 4:
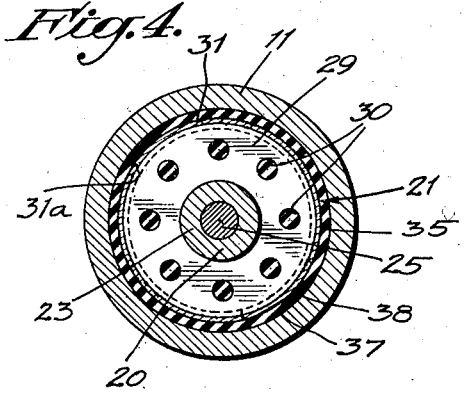
Fig. 4 is a section taken on the line 4—4 of Fig. 3.

As shown in Figs. 2 to 4 inclusive, the piston of my invention comprises a hub 20 and a packer 21. The hub 20 is a metallic casting whereas the packer 21 is of a suitable packing material such as rubber composition. The hub 20 has a nave 23 which has a concentric tapered bore 24 through which a tapered portion 25 of the piston rod 13 extends. A nut 26 is threaded on an end 27 of the piston rod 13 and holds the casting 20 tightly in place. Extending from the periphery of the nave 23 substantially at the central part thereof is a radial flange 29 having openings 30 formed therein. A cylindrical reinforcing ring 31 preferably formed of a fibrous composition is suitably channeled internally at 31ª and split so that it can be expanded and slipped over the radial flange 29 until the ring will contact so this channel receives the periphery of the flange 29, locking the ring 31 to the flange. I have found "whaleite" to be a superior material for the reinforcing ring 31, but other fibrous materials of different degrees or elasticity may be used for this purpose.

The packer 21 has an inner band 32 which surrounds the nave 23 and engages the peripheral face thereof. A radial wall 33 extends outwardly from the inner band 32 in which radial wall the radial flange 29 is embedded. The openings 30 in the radial flange 29 are filled with material of the radial wall 33. A peripheral wall 35 is formed at the periphery of the radial wall 33. As shown in Fig. 2 the opposite ends 36 of the radial wall 35 are of larger circumference than the central inner part of the peripheral wall 35. When the piston 15 is placed in the cylinder 11 the ends 36 of the peripheral wall 35 are forced inwardly so that the ends are of the same circumference as the central part of the peripheral wall 35. By reason of the fact that the ends 36 are compressed and constricted when the piston is placed in the cylinder 11 there will be an outward pressure of an outer peripheral face 37 of the peripheral wall 35 against an inner cylindrical face 38 of the cylinder 11. This resilient pressure automatically maintains a satisfactory seal between the piston and the cylinder 11 until the peripheral wall 35 is worn so that there is no more expansion of the ends 36 thereon. End faces 40 of the peripheral wall 35 are beveled, as shown clearly in Fig. 3, so as to provide sharp corners which tend to guide the substance being pumped away from the face 38 so that it will not enter between this face 38 and the face 37 of the peripheral wall 35. The packer 21 is formed so that annular channels 43 are provided thereby. When the piston operates and a pressure is caused on either side of the piston, this pressure forces outwardly on the adjacent end 36 of the peripheral wall 35 and assists in holding it in pressurable engagement with a cylinder 11.

The casting 20 is machined only for the reception of the tapered end 25 of the piston rod 13. The other faces of the casting are left rough. The packer 21 is vulcanized upon the casting 20, being placed in a suitable mold so that it may be properly shaped. It is found that a rough surface is very satisfactory for an adhering of the packer 21 to the casting 20. The packer 21 when it is being molded enters into the pores of the casting and it fills the openings 30 of the radial flange 20.

Figure 5:
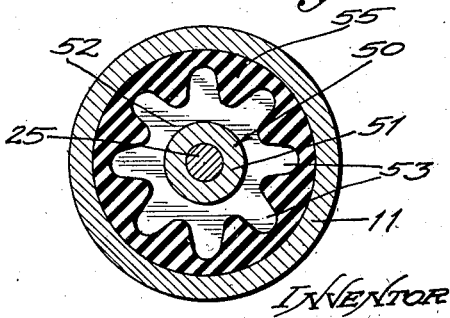
Fig. 5 is a section of the same character as Fig. 4, but showing an alternative form of my invention.

In Fig. 5 I show another form of my invention, this form having a slightly different design of casting. This form of my invention provides a casting 50 having a nave 51 from which there extends a radial flange 52. This flange 52 instead of having openings formed therein is provided with a plurality of radially extending nodes 53 so that it has the aspect of a star. When a packer 55 is molded thereon, the spaces between the nodes 53 are filled and in this manner the packer is firmly secured to the casting 50.

In recapitulating the preceding, it is in the first place quite evident that my piston may be economically manufactured. The hub may be cheaply cast, and is only machined in the core to receive the end 25 of the piston rod. The packer may be molded in place with but little expense. The casting, being rough, furnishes a surface to which the packer may firmly attach itself.

In the second place it is manifest that my piston is a valuable contribution to the art. The performance of my invention is superior to any piston having packing which must be frequently readjusted. The working period of my piston outlasts by far the life of an ordinary piston packing and has the profitable advantage of not requiring any adjustment during its life. When my piston no longer operates efficiently it may be cheaply replaced.

I claim as my invention:

1. In a pump piston, the combination of: a metallic hub comprising a cylindrical nave and a radial flange extending from said nave; and a packer moulded on said hub comprising an inner band formed around said nave, a radial wall enclosing said radial flange, and a peripheral wall formed at the outer part of said radial wall.

2. A combination as defined in claim 1 in which the ends of said peripheral wall are constricted in circumference when said piston is placed in a cylinder.

3. A combination as defined in claim 1 in which said radial flange has openings formed therein, which openings are filled by said packer.

4. In a pump piston, the combination of: a metallic hub formed to be secured to a piston rod; a radial flange formed upon said hub; a fibrous cylindrical reinforcement applied peripherally to said flange; and a packer formed upon said hub and said reinforcement.

5. In a pump piston, the combination of: a metallic hub formed to be secured to a piston rod; a radial flange formed upon said hub; a split cylindrical reinforcement applied peripherally to said flange; and a packer formed upon said hub and said reinforcement.

6. In a pump piston, the combination of: a metallic hub; a packer molded onto said hub, said packer having a continuous peripheral wall, and said peripheral wall having an annular portion normally of larger diameter than the cylinder in which it operates; and a continuous annular reinforcement situated in said peripheral wall.

7. In a pump piston, the combination of: a metallic hub; a packer molded onto said hub, said packer having a continuous peripheral wall, and said peripheral wall having an annular portion normally of larger diameter than the cylinder in which it operates; and a separate reinforcement situated in said peripheral wall.

8. In a pump piston, the combination of: a hub member; a packer carried by said hub member, said packer having a peripheral wall; and a separate reinforcement embedded in said peripheral wall.

In testimony whereof, I have hereunto set my hand at Los Angeles, California, this 4th day of September, 1925.

CHARLES LAMB.